United States Patent [19]

Kosik et al.

[11] Patent Number: 5,700,227
[45] Date of Patent: Dec. 23, 1997

[54] AUTOMATIC CLUTCH CONTROL

[75] Inventors: Franz Kosik, Ostfildern; Günter Wörner, Kemen, both of Germany

[73] Assignee: Mercedes-Benz AG, Stuttgart, Germany

[21] Appl. No.: 699,667

[22] Filed: Aug. 19, 1996

[30] Foreign Application Priority Data

Aug. 21, 1995 [DE] Germany .......... 195 30 612.0

[51] Int. Cl.$^6$ .......................................... B60K 41/24
[52] U.S. Cl. .................. 477/171; 192/12 R; 192/13 R
[58] Field of Search ................... 477/171, 173; 192/12 R, 13 R

[56] References Cited

U.S. PATENT DOCUMENTS 5,551,932  9/1996  Ishii et al. ..................... 477/171

FOREIGN PATENT DOCUMENTS

| 0 482 262 | 4/1992 | European Pat. Off. . |
| 26 56 888 | 6/1977 | Germany . |
| 44 26 260 | 2/1995 | Germany . |
| 62-216842 | 9/1987 | Japan . |

*Primary Examiner*—Dirk Wright
*Attorney, Agent, or Firm*—Klaus J. Bach

[57] ABSTRACT

In a method of operating an automatic clutch arranged between an engine and a drive train of a vehicle during low speed operation of the vehicle which has a brake system, a clutch control unit and sensors supplying to the clutch control unit information concerning vehicle speed and actuation of the brake system, the clutch is controlled below a certain vehicle speed to transmit only a limited torque to the drive train and, upon actuation of the brake system, the clutch is controlled such that the torque transmitted to the drive train decreases with increasing effectiveness of the brake system.

5 Claims, 2 Drawing Sheets

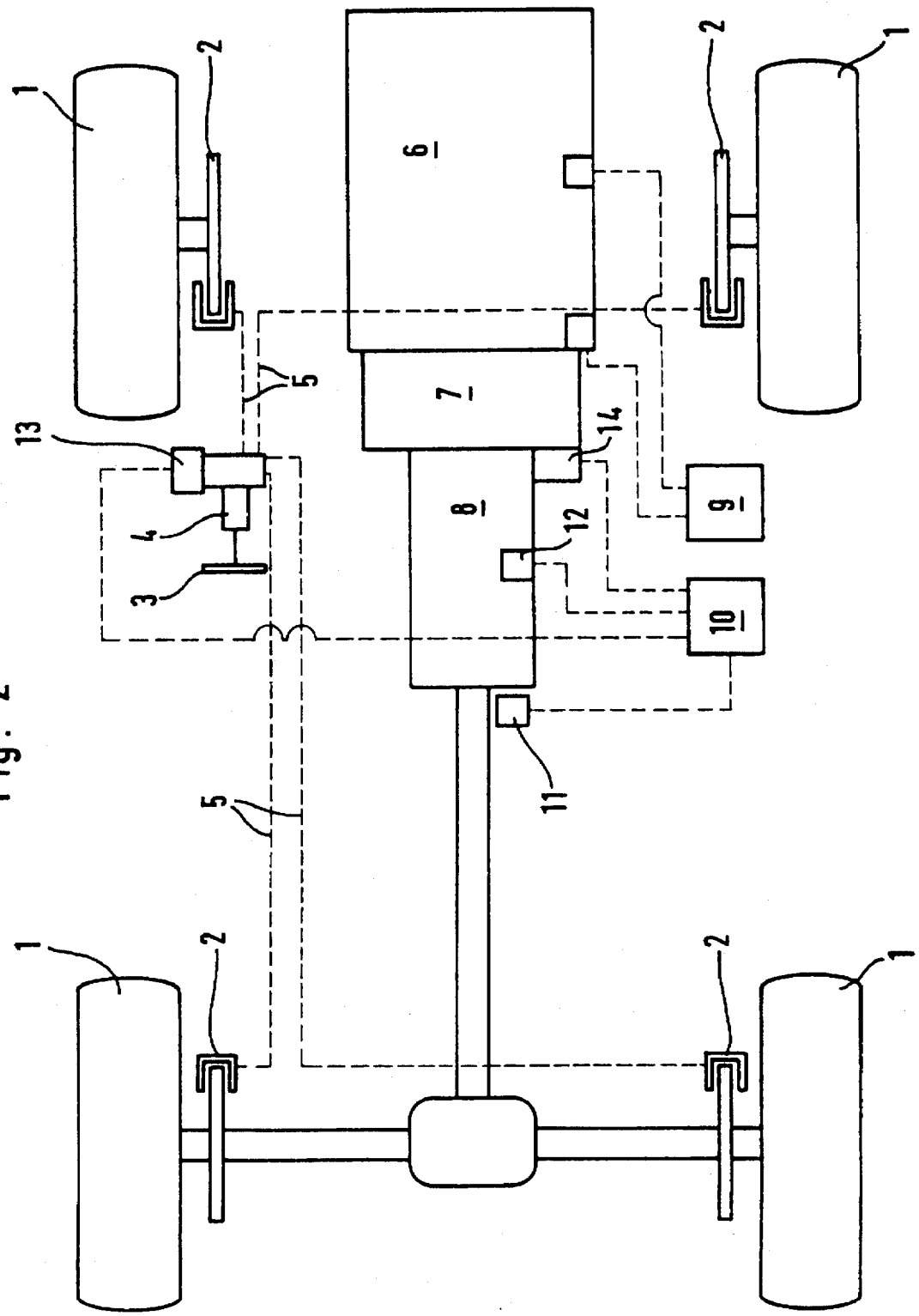

AUTOMATIC CLUTCH CONTROL

BACKGROUND OF THE INVENTION

The invention relates to a method of controlling an automatic clutch arranged between a motor, especially an internal combustion engine, and a drive train of a vehicle during vehicle creeping phases that is during start up or during transition phases between low vehicle speeds and stops wherein a clutch control unit operates the clutch depending on vehicle speed and disengages the clutch whenever the vehicle brakes are activated.

Vehicles with normal transmissions and with automatically operated clutches are generally known and are manufactured in series.

The publication PATENT ABSTRACTS OF JAPAN, relating to JP62-216842 (A) discloses an arrangement wherein, for the automatic control of a clutch at a low vehicle speed, the actuation of a gas pedal for controlling engine power output and of a vehicle braking system are taken into consideration. Whenever the vehicle brake is actuated at low vehicle speed the clutch is disengaged. If the brakes are not actuated at low vehicle speed a check is performed whether or not the gas pedal is actuated. If neither the vehicle brakes nor the gas pedal are actuated the clutch is controlled so as to be half way engaged. This procedure is to facilitate the vehicle operation under heavy traffic conditions.

DE OS 26 56 888 discloses a creep drive system for an industrial vehicle wherein the actuation of the clutch is coupled with the operation of the vehicle brakes. Both, the vehicle braking system and the clutch are operated by hydraulic operating systems and the hydraulic brake operating system is in communication with the hydraulic clutch operating system by way of a control valve which opens when the pressure in the hydraulic brake operating system exceeds a predetermined threshold value. The hydraulic brake system pressure which is then effective also in the hydraulic clutch operating system causes the clutch to disengage. As a result, the clutch remains engaged as long as the hydraulic brake operating pressure remains below the threshold value. When the hydraulic brake operating pressure exceeds the threshold value the clutch is disengaged. Consequently, the clutch will be automatically engaged before a brake pedal operating the hydraulic brake system of the vehicle is fully released.

DE 44 26 260 discloses an arrangement wherein an automatic vehicle clutch is automatically actuated toward disengagement of the clutch when the brake system of the vehicle is actuated at low vehicle speed.

EP 0482262 A2 discloses a vehicle provided with an automatic transmission and with an automatically operated clutch and brakes which are so controlled that, under certain operating conditions, creeping of the vehicle is prevented.

It is the object of the present invention to improve the operating behavior of a vehicle with an automatic clutch during creeping phases especially if the vehicle is to be started on a grade after a stop.

SUMMARY OF THE INVENTION

In a method of operating an automatic clutch arranged between an engine and a drive train of a vehicle during low speed operation of the vehicle which has a brake system, a clutch control unit and sensors supplying to the clutch control unit information concerning vehicle speed and actuation of the brake system, the clutch is controlled below a certain vehicle speed so as to transmit only a limited torque to the drive train and, upon actuation of the brake system, the clutch is controlled such that the torque transmitted to the drive train decreases with increasing effectiveness of the brake system.

The invention is based on the general idea to monitor, during creeping phases of the vehicle, the actual braking effects and to take the actual braking effects into account for the automatic control of the clutch.

It is advantageous that the invention can be realized with little design efforts.

Many of today's hydraulic vehicle brake operating systems include one or more pressure sensors by which the hydraulic system pressure and the corresponding braking power are monitored. Those pressure sensors are provided already because the hydraulic pressure in the brake system needs to be monitored for example for limiting drive slip of the drive wheels so that the brakes can be automatically applied for a slipping wheel.

Furthermore, the electronic control arrangements which are present in today's vehicles for the surveillance of many functions—among others also the operation of an automatic clutch—are readily suitable to be used also for additional parameters such as the braking effectiveness.

In place of sensors for sensing the hydraulic brake system pressure, force sensors may be provided which measure directly or indirectly the forces which are applied to the vehicle brake.

It would further be possible to determine the movement of brake operating members which corresponds to the braking forces or an operating travel difference between brake operating elements.

In a preferred embodiment of the invention the vehicle engine includes an automatic engine control unit which prevents a drop-off of the engine speed (rpm) below a predetermined minimum value such as the engine idle speed that is which acts to prevent such an engine speed drop-off. Then it is insured that the vehicle engine will operate with sufficient power to smoothly accelerate the vehicle after a vehicle stop.

The invention will be described below in greater detail on the basis of the accompanying drawings.

BRIEF DESCRIPTION OF THE DRAWINGS

FIG. 2 is a schematic representation of a vehicle including a clutch control arrangement according to the invention.

DESCRIPTION OF A PREFERRED EMBODIMENT

Figure 1:
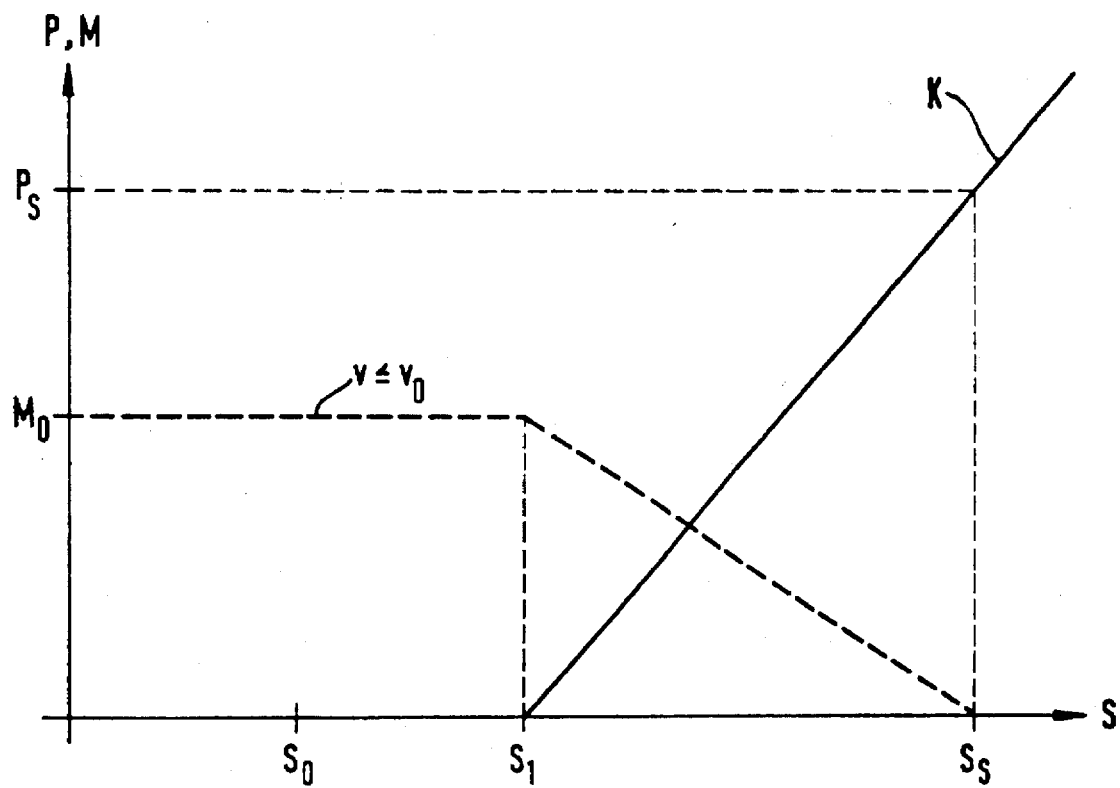
FIG. 1 shows a diagram giving the brake force F and the torque that can be transmitted by a clutch in dependence on brake pedal travel or respectively, the travel of an other operating mechanism for the vehicle braking system.

When a hydraulically operating brake of a vehicle is not actuated the hydraulic pressure of the operating system has the value O (K at $S<S_1$). Assuming now that the brake pedal of the vehicle brake is actuated, the hydraulic pressure P remains at the value O as long as the pedal travel S is smaller than the value $S_1$. However, before the pedal reaches the position $S_0$ the brake light switch is actuated at a smaller travel distance $S_0$ whereby the brake lights associated with the vehicle braking system are energized.

As soon as the brake pedal travel exceeds the value $S_1$, the hydraulic pressure P increases essentially linearly along the line K whose shape depends on the design of the vehicle brake system.

Assuming now that the vehicle is moving at a very low speed V which is below a threshold value $V_0$, the automatic clutch is engaged to provide only a relatively small drive torque $M_0$ as long as a pressure sensor monitoring the hydraulic pressure of the brake system indicates that the hydraulic system pressure P is essentially 0.

As soon as the pressure sensor senses an increase in the hydraulic system pressure P the torque provided by the controlled engagement of the clutch is reduced inversely to the increase of the pressure P in the hydraulic brake operating system until, at a hydraulic brake system pressure $P_s$ (or a corresponding pedal travel distance $S_s$), the automatic clutch is fully disengaged at which point the torque transmitted by the clutch becomes 0.

Consequently, it is insured that the drive torque which is supplied to the drive wheels becomes smaller as the braking effectiveness increases. At the same time, it is avoided that the clutch is fully disengaged as long as the vehicle is moving that is while the braking system is not fully effective.

If the brake is not operated, full disengagement of the clutch is provided for only when the vehicle is at a standstill and even then only if the gas pedal for controlling engine power output is not actuated that is if the engine is idling or running at low engine speed. For such a control of the automatic clutch, signals of appropriate sensors—for vehicle or engine speed—are utilized.

If the vehicle is moving at a speed greater than $V_0$ the automatic clutch can be automatically controlled essentially in the way as it is shown in FIG. 1. In this case, however, the torque that can be transmitted by the clutch while the brakes are not actuated should generally be above the value $M_0$ and it can further be provided that the clutch is fully disengaged only if the pressure in the hydraulic brake operating system is clearly above the value $P_s$.

FIG. 2 is a schematic top view of a vehicle showing essentially only the front and the rear wheel with associated brakes 2 operable by a brake pedal 3 which operates a hydraulic master cylinder 4 with which the slave cylinders of the brakes 2 are in communication via hydraulic lines 5.

In the embodiment as shown in FIG. 2 the rear wheels of the vehicle are driven by an engine 6 by way of an automatically operated clutch 7 and a manual transmission 8.

The engine 6 is provided with an automatic engine control unit 9 which operates in a well known manner and which at least controls the engine such that the actual engine speed will not fall below a minimum desired engine speed generally the engine idle speed. Furthermore, there is provided for the clutch 7 a control unit 10 which, if desirable, may be combined with the motor control unit 9 to a single control unit.

At its input side the control unit 10 is connected to a vehicle speed sensor 11 such as a speedometer of the vehicle.

At the input side, the control unit 10 is further connected to a sensor 12 whose signals identify the instant transmission ratio for the transmission that is which gear is engaged. Another sensor 13 supplies signals to the control unit 10 indicating whether a hydraulic pressure is generated in the hydraulic brake system by the master cylinder 4 which is sufficient to apply the vehicle brakes.

At the output side, the control unit 10 is connected to a preferably electrical control motor 14 which operates the clutch 7 so that, depending on the control position of the motor 14, the clutch 7 is either fully disengaged or fully engaged or controlled to be partially engaged so as to be capable of transmitting various torques.

If the control unit 10 senses on the basis of the signals supplied by the sensor 11 that the vehicle is moving at very low speed the control motor 14 is so adjusted that the clutch 7 provides for a certain slip. If it is then determined from the signals provided by the sensors 13 that the brakes are effectively operated that is that the hydraulic brake system pressure is sufficient to effectively brake the vehicle, the control motor 14 is operated so as to reduce the torque which can be transmitted by the clutch 7 that is to increase the clutch slippage. For this control step, the signals of the sensors 12 can also be taken into consideration in such a way that the clutch 7 is differently controlled for different transmission ratios, that is when the manual transmission 8 is in different gears.

It is noted that, in place of using the hydraulic pressure of the brake system, the sensor 13 may be a position sensor sensing the operating travel distance and/or the stroke of operating elements of the vehicle brake system. The stroke as well as the relative movement of operating elements of the brake system are suitable signal sources as they essentially correspond to the pressure in the hydraulic brake operating system.

What is claimed is:

1. A method of operating an automatic clutch arranged between a motor, especially an internal combustion engine, and a drive train of vehicle during creeping phases of said vehicle such as vehicle starts or during transition periods between low speeds and stops, said vehicle having a brake system, a clutch control unit for controlling said clutch, sensor means for determining the vehicle speed and sensor means for determining actuation of said brake system, wherein, below a threshold value of said vehicle speed and at low engine speed, said clutch is controlled so as to transmit only a limited torque to said drive train and, with an actuation of said brake system of the vehicle, said clutch is controlled dependent on signals provided by said sensor means for determining the vehicle speed and by said means for determining actuation of said brake system, such that the torque transmitted to the drive train decreases with increasing effectiveness of said brake system.

2. A method according to claim 1, wherein said brake system is a hydraulic brake operating system and said torque transmitted by said clutch to said drive train is decreased with increasing pressure in said hydraulic brake operating system.

3. A method according to claim 1, wherein the torque transmitted by said clutch to said drive train is decreased when actuation of said brake system exceeds a threshold value.

4. A method according to claim 1, wherein the torque transmitted by said clutch to said drive train is decreased in accordance with a travel length of an operating element for the brake system.

5. A method according to claim 1, wherein said engine includes a control unit which counteracts any engine speed decrease below a certain threshold value (idle engine speed).

* * * * *